(12) United States Patent
Sengupta et al.

(10) Patent No.: US 8,356,303 B2
(45) Date of Patent: Jan. 15, 2013

(54) METHOD AND SYSTEM FOR INTEGRATED SCHEDULING AND REPLICATION IN A GRID COMPUTING SYSTEM

(75) Inventors: Shubhashis Sengupta, Bangalore (IN); Anirban Chakrabarti, Kolkata (IN); Lopamudra Chakrabarti, legal representative, Bangalore (IN)

(73) Assignee: Infosys Technologies Ltd. (IN)

( * ) Notice: Subject to any disclaimer, the term of this patent is extended or adjusted under 35 U.S.C. 154(b) by 1040 days.

(21) Appl. No.: 12/315,958

(22) Filed: Dec. 8, 2008

(65) Prior Publication Data

US 2009/0282418 A1 Nov. 12, 2009

(30) Foreign Application Priority Data

Dec. 10, 2007 (IN) .............................. 2958/CHE/2007

(51) Int. Cl.
*G06F 9/46* (2006.01)
(52) U.S. Cl. ......................................... 718/102; 718/101
(58) Field of Classification Search ........................ None
See application file for complete search history.

(56) References Cited

U.S. PATENT DOCUMENTS

| | | | | |
|---|---|---|---|---|
| 7,278,106 | B1 * | 10/2007 | Mason ........................... | 715/744 |
| 7,403,994 | B1 * | 7/2008 | Vogl et al. ..................... | 709/227 |
| 2001/0010059 | A1 * | 7/2001 | Burman et al. ................ | 709/224 |
| 2001/0013039 | A1 * | 8/2001 | Choi ........................ | 707/104.1 |
| 2001/0031041 | A1 * | 10/2001 | Sun .............................. | 379/67.1 |
| 2001/0050920 | A1 * | 12/2001 | Hassell et al. ................ | 370/465 |
| 2002/0133577 | A1 * | 9/2002 | Iwata ............................ | 709/221 |
| 2003/0021231 | A1 * | 1/2003 | Evans ........................... | 370/230 |
| 2003/0078918 | A1 * | 4/2003 | Souvignier et al. ............... | 707/3 |
| 2003/0115326 | A1 * | 6/2003 | Verma et al. .................. | 709/225 |
| 2004/0221019 | A1 * | 11/2004 | Swildens et al. .............. | 709/217 |
| 2005/0193099 | A1 * | 9/2005 | Reus et al. .................... | 709/220 |
| 2006/0149714 | A1 * | 7/2006 | Fellenstein et al. ............... | 707/3 |
| 2006/0168312 | A1 * | 7/2006 | Young et al. .................. | 709/235 |
| 2006/0187923 | A1 * | 8/2006 | Yu ................................. | 370/389 |
| 2006/0218222 | A1 * | 9/2006 | Brahmbhatt et al. ......... | 709/201 |
| 2007/0038498 | A1 * | 2/2007 | Powell et al. ..................... | 705/8 |
| 2007/0067595 | A1 * | 3/2007 | Ghose ........................... | 711/167 |
| 2007/0226773 | A1 * | 9/2007 | Pouliot ............................. | 726/1 |
| 2007/0245372 | A1 * | 10/2007 | Yasuda .......................... | 725/34 |
| 2008/0049349 | A1 * | 2/2008 | Nakase et al. ................. | 360/48 |
| 2008/0320482 | A1 * | 12/2008 | Dawson et al. ............... | 718/104 |
| 2009/0064151 | A1 * | 3/2009 | Agarwal et al. .............. | 718/102 |
| 2009/0113045 | A1 * | 4/2009 | Kozisek ........................ | 709/224 |
| 2011/0125698 | A1 * | 5/2011 | Rome et al. ..................... | 706/50 |

* cited by examiner

*Primary Examiner* — Emerson Puente
*Assistant Examiner* — Adam Lee
(74) *Attorney, Agent, or Firm* — Lerner, David, Littenberg, Krumholz & Mentlik, LLP

(57) ABSTRACT

A method for scheduling a plurality of computation jobs to a plurality of data processing units (DPUs) in a grid computing system 100. The method includes receiving a first computation job by a scheduling DPU from the plurality of computation jobs. Further, the method includes scheduling the first computation job at a first set of DPUs in the grid computing system based on first scheduling criteria. Furthermore, the method includes scheduling the first computation job at a first DPU from the first set of DPUs based on second scheduling criteria. The method also includes storing information about the first computation job and the first set of DPUs in a history table at the scheduling DPU. The method further includes storing information about the first DPU in a demand matrix of the first set of DPUs.

50 Claims, 8 Drawing Sheets

METHOD AND SYSTEM FOR INTEGRATED SCHEDULING AND REPLICATION IN A GRID COMPUTING SYSTEM

BACKGROUND OF THE INVENTION

The present invention relates generally to the field of grid computing and more particularly, to a method and system for integrated scheduling and replication in a grid computing system.

Many organizations or laboratories need to perform numerous computations to generate desirable results. Data required for these computations may be present at different geographical locations. For example, a financial consultancy firm may require to access data from its computing systems in India, and the United State of America, to compute best investment plans for its clients. Another example of a drug discovery lab can be considered. In such a set-up various chemical compositions are developed and tested at different geographical locations. Computationally intensive tasks need to be performed on the data at these locations after collating the data to obtain the final product. The task of performing computational tasks on the data accessed from heterogeneous sources which may also be geographically separated gave rise to the concept of grid computing. In a grid computing system, a plurality of Data Processing Units (DPUs) or computing systems that are geographically dispersed are interconnected with each other. A computation job to be processed by the grid computing system may require plurality of files for processing. These files may be spread across more than one data processing unit (DPU) in the grid computing system. The time required to process the computation job at a DPU in the grid computing system thus depends on factors that include, but are not limited to, processing time required to process the computation job at the DPU, and the time required to move some of the plurality of files required by the computation job from other DPUs in the grid computing system to the DPU. The time required to move some of the plurality of files is in turn dependent on the bandwidth available with the DPU. Thus there is a need for methods and systems that take into consideration these factors, and schedule the computation job in such a way that it is processed in a minimum optimal time.

In one such method, files present with one DPU are replicated at every other DPU in the grid computing system. The process of replicating data across the grid computing system requires a large amount of time. The data is not optimally spread; hence there is considerable misuse of the available memory space, which leads to increase in the time required to process computation jobs. Other replication methods include, but are not limited to, replicating each of the plurality of files required by the computation job at the DPU processing it. In case the DPU cannot hold few files from the plurality of files due to space constraints, the oldest file stored in the memory/disk of the DPU is deleted. Although the time required for replicating data is reduced. The method doesn't make optimal usage of memory/disk available with the DPU and can lead to replication of every file at the DPU in case different computation jobs are scheduled at the DPU.

Other methods known in the art, consider scheduling to be a primary concern over replication. These methods result in a longer waiting time to access files that are not present with the DPU from other DPUs in the grid computing system. Hence, there is a need of a system that manages replication of data files based on the scheduling decisions taken by the grid computing system.

Due to the distributed nature of grid computing systems, a centralized system that integrates replication and scheduling through out the grid computing system will incur heavy costs and may not be feasible in many cases.

A system and method known in the art, which integrates replication and scheduling, determines whether to replicate data from a DPU to other DPUs based on the scheduling information. The system makes an assumption that each computation job requires only one file at a time for processing. But in practical scenarios, a computation job requires multiple files for processing. Further, a computation job may not be scheduled at the DPU that contains at least one of the file required by that computation job, but at a DPU that is close to DPUs containing all files required by the computation job.

The drawbacks in existing scheduling and replication methods and systems in grid computing systems give rise to the need to develop a method and system that integrates scheduling and replication in grid computing system in a distributed and scalable manner.

BRIEF SUMMARY OF THE INVENTION

According to one embodiment of the present invention, a method for scheduling processing of a plurality of computation jobs in a grid computing system is disclosed. The grid computing system includes a plurality of data processing units (DPUs) that are interconnected with each other. Each of the DPUs has a set of data files in its memory/disk. Each of the plurality of computation jobs require a set of input data files, which include files from the set of data files stored at the plurality of DPUs, for processing. The method includes receiving a first computation job from the plurality of computation jobs at a scheduling data processing unit (DPU). The method further includes, scheduling the first computation job at a first set of DPUs from a plurality of sets of DPUs based on a first scheduling criteria. The plurality of sets of DPUs is formed by sub-grouping the plurality of DPUs in the grid computing system. A core DPU is appointed for each of the plurality of sets of DPUs. Further, the method includes the step of scheduling the first computation job at a first DPU from the first set of DPUs based on second scheduling criteria. The method also includes the step of storing information about the first set of DPUs and data files present at the first set of DPUs in a history table. The history table is stored at the scheduling DPU.

According to another embodiment of the present invention, a method for replication of data available in a grid computing system is disclosed. The grid computing system includes a plurality of data processing units (DPUs) that are interconnected with each other. Each data processing unit (DPU) has a set of data files in its memory/disk. Each of the plurality of computation jobs require a set of input data files, which include files from the set of data files stored at the plurality of DPUs, for processing. The plurality of DPUs is further sub-grouped to form a plurality of sets of DPUs and a core DPU is appointed for each of the plurality of sets of DPUs. The method includes the step of a first set of DPUs picking at least one new file from other sets of DPUs in the grid computing system. Communication between the first set of DPUs and the other sets of DPUs happens via respective core DPUs. The at least one new file is picked based on computation jobs scheduled at the first set of DPUs. Further, a second file from the at least one new file is captured based on first replication criteria. The second file belongs to a second set of data files present at a second set of DPUs in the grid computing system. Furthermore, the method includes the step of replacing a first file from a first set of data files present at the first set of DPUs based on a second replication criteria.

According to yet another embodiment of the invention, another method of replication of data in a grid computing system is disclosed. The grid computing system includes a plurality of data processing units (DPUs) that are interconnected with each other. Each data processing unit (DPU) has a set of data files in its memory/disk. Each of the plurality of computation jobs require a set of input data files, which include files from the set of data files stored at the plurality of DPUs, for processing. The plurality of DPUs is further sub-grouped to form a plurality of sets of DPUs and a core DPU is appointed for each of the plurality of sets of DPUs. The method includes a steps of calculating expected latency associated with each file from a first set of data files. The first set of data files is a group of files present at a first DPU in the grid computing system. The first DPU is also a part of a first set of DPUs in the grid computing system. The method further includes the step of picking at least one new file by the first DPU from other DPUs in the first set of DPUs based on the expected latency associated with each file from the first set of data files. Further, a second file from the at least one new file that is present at a second DPU from the first set of DPUs is captured by a first core DPU of the first set of DPUs. The first core DPU captures the second file when expected latency of the second file is less than a minimum expected latency among the first set of data files. Finally, the method includes the step of replacing a first file from the first set of data files with the second file when number of data files in the first set of data files is equal to or greater than a maximum number of data files.

According to another embodiment of the present invention, a method for managing and clustering a plurality of data processing units (DPUs) in a grid computing system is disclosed. The plurality of DPUs is interconnected with each other. Each of the plurality of DPUs has a set of data files stored in its memory/disk that are required by a plurality of computation jobs scheduled for processing in the grid computing system. The method includes a step of a second set of DPUs picking a first DPU from a first set of DPUs in the grid computing system. The plurality of DPUs in the grid computing system is initially sub-grouped to form a plurality of sets of DPUs. A core DPU is appointed for each of the plurality of sets of DPUs. The communication between the first set of DPUs and the second set of DPUs happens via their respective core DPUs. Further, the method includes adding the first DPU to the second set of DPUs based on predefined criteria. Finally, the method includes the step of adding information in a demand matrix present at a first core DPU and a second core DPU. The step also includes adding information to a history table present at a scheduling DPU. The scheduling DPU receives the plurality of computation jobs and schedules them for processing at one of the plurality of sets of DPUs.

According to one embodiment of the present invention, a system for scheduling a plurality of computation jobs in a grid computing system and managing the grid computing system is disclosed. The grid computing system includes a plurality of data processing units (DPUs) interconnected with each other, where each of the plurality of data processing units has a set of data files stored in its memory/disk. The plurality of computation jobs needs few data files from the set of data files for processing. The system includes a scheduling module that schedules each of the plurality of computation jobs to at least one the plurality of DPUs based on sets of data files available with the plurality of DPUs. The system further includes a replication module that replicates set of data files available with a DPU to other DPUs in the grid computing system based on scheduling of the plurality of computation jobs. The system also includes a grid management module that sub-groups the plurality of DPUs to form a plurality of sets of DPUs and manages each of the plurality of sets of DPUs.

According to another embodiment of the present invention, a computer storage device tangibly embodying a plurality of instructions adapted for scheduling processing of a plurality of computation jobs in a grid computing system is disclosed. The grid computing system includes a plurality of data processing units (DPUs) that are interconnected with each other. Each of the plurality of DPUs stores a set of data files in its memory/disk. Each of the plurality of computation jobs need a set of input data files for processing. The computer storage device includes a computer readable medium that stores program code adapted for receiving a first computation job from the plurality of computation jobs. This program code is stored at a scheduling data processing unit (DPU). Further, the computer readable medium stores program code adapted for scheduling the first computation job to a first DPU from a plurality DPUs in the grid computing system based on scheduling criteria. The first computation job is initially scheduled at a first set of DPUs from a plurality of sets of DPUs, which are formed by sub-grouping the plurality of DPUs in the grid computing system. The computer readable medium also stores program code adapted for storing information about the first set of DPUs and data files present at the first set of DPUs in a history table. Furthermore, the computer readable medium stores program code adapted for storing information about the first DPU and the first computation job in a demand matrix, which is present at a core DPU of each of the plurality of sets of DPU. The computer readable medium even includes program code adapted for replicating set of data files available with a DPU to other DPUs in the grid computing system based on scheduling of the plurality of computation jobs. Finally, the computer readable medium includes program code adapted to sub-group the plurality of DPUs to form the plurality of sets of DPUs and manage each of the plurality of sets of DPUs.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

The present invention relates to a system for integrated scheduling and replication in a grid computing system and the method thereof. The grid computing system has a plurality of data processing units (DPUs) that can process data to generate outputs. Each of the plurality of DPUs has a set of data files stored in its memory/disk. A number of concurrent users submit a plurality of computation jobs at the system. The system according to an embodiment of the present invention, schedules the plurality of computation jobs based on pre-defined criteria. The predefined criteria checks for data files used by a computation job to be scheduled and the data files present at each of the plurality of DPUs. The scheduling information is stored at a scheduling DPU, which receives the plurality of computation jobs from users.

Further, the scheduling information is used by a replication module in replicating data files present at a DPU across the grid computing system. The replication module performs the replication method, which replicates data files in the grid computing system based on the demand of these data files. The demand of data files is determined from the scheduling information stored at the scheduling DPU. A data file that is heavily used by a DPU in the grid computing system is replicated on that DPU.

In addition, the plurality of DPUs are sub-grouped to form a plurality of sets of DPUs. A core DPU is elected for each of the plurality of sets of DPUs. The system according to another embodiment of the present invention, schedules a computation job at one of the plurality of sets of DPUs based on sets of data files present with DPUs present in the one of the set of DPUs. The core DPU then schedules the computation job at one DPU from the one of the set of DPUs. This decision is based on the data files present at that DPU.

Figure 1:
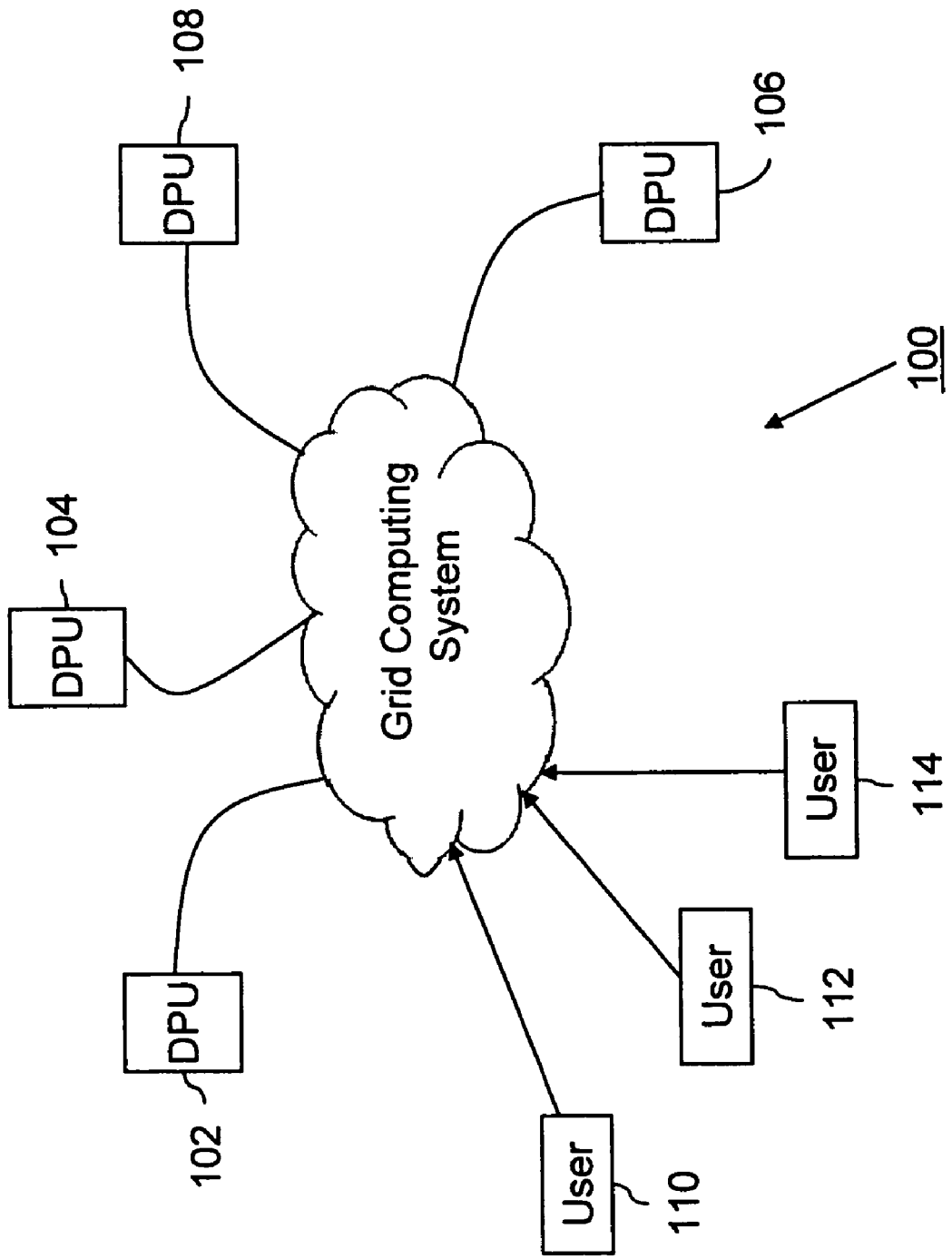
FIG. 1 illustrates a grid computing system in which the present invention can be practiced.

Referring now to figures, FIG. 1 illustrates a grid computing system 100 in which the present invention can be practiced. The grid computing system 100 includes a plurality of data processing units (DPUs) 102, 104, 106, and 108. Examples of DPUS 102, 104, 106, and 108 include, but not limited to, personal computers, servers, laptops, Personal Digital Assistants (PDAs), databases, or any other system capable of storing and processing data. The DPUs 102, 104, 106, and 108 that may be located at different geographical locations, have a memory or a magnetic disk to store a set of data files, that are used by other DPUs in the grid computing system 100. Further, the grid computing system includes a plurality of users 110, 112, and 114. The users 110, 112, and 114 may be operating from the same geographical location or may operate from remote locations. The users 110, 112, and 114 submit a plurality of computation jobs to the grid computing system 100. Examples of the plurality of computation jobs include, but are not limited to, updating a sales file with latest information from various locations, processing to find the total sales figure, and forecasting future sales figures and generating reports customized for every users needs, or receiving inputs from various DPUs for processing in a drug discovery project. The plurality of computation jobs require at least one the set of data files present with one of the plurality of DPUs 102, 104, 106, and 108.

The grid computing system 100 receives the plurality of computation jobs from the plurality of users 110, 112, and 114 and schedules them for execution at one of the plurality DPUs 102, 104, 106, and 108. The plurality of DPUs 102, 104, 106, and 108 then use their processing power to process the data files required by the plurality of computation jobs to produce desired outputs.

Figure 2:
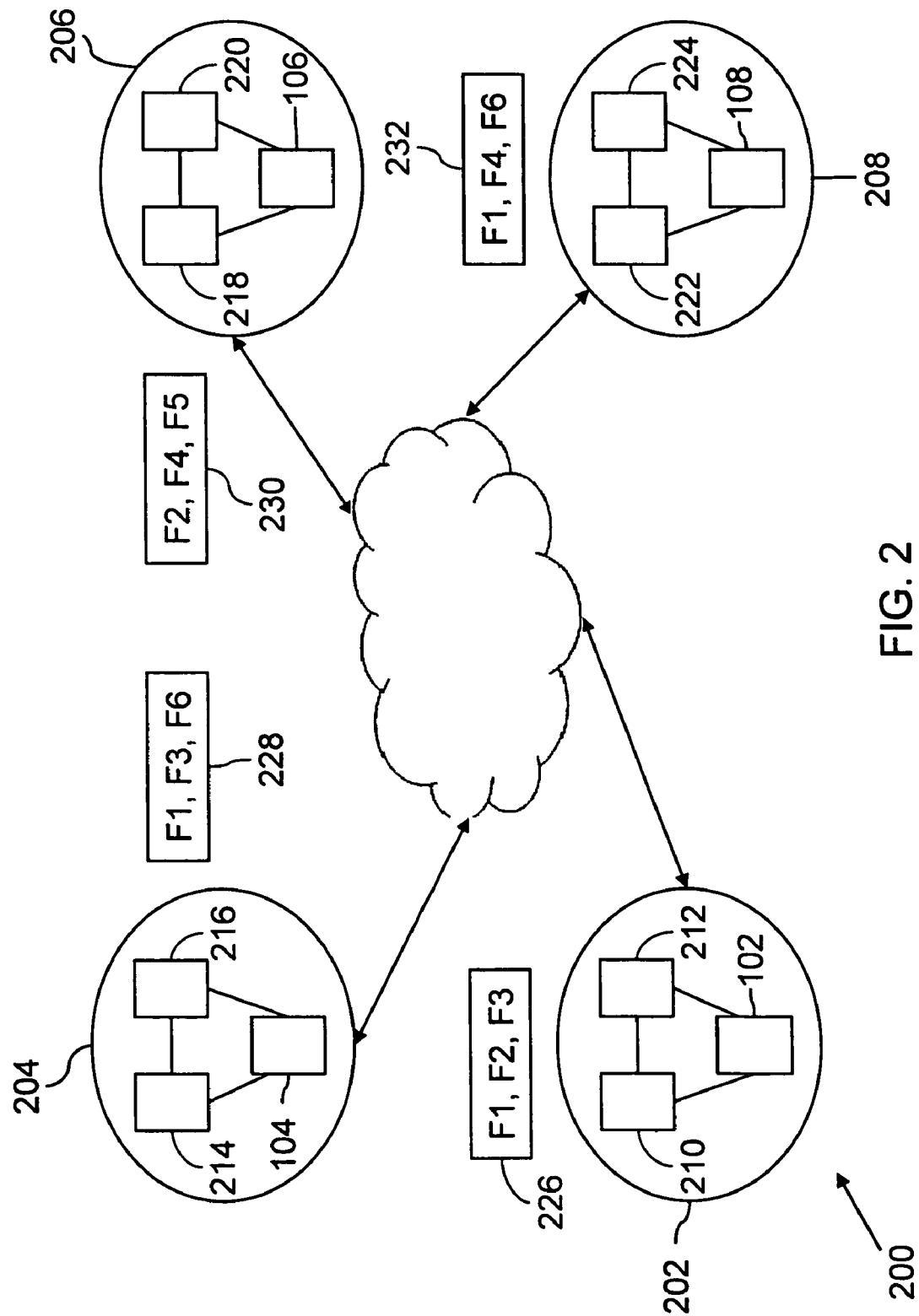
FIG. 2 illustrates a configuration of the grid computing system in accordance with various embodiments of the present invention.

FIG. 2 illustrates a configuration 200 of the grid computing system 100 in accordance with various embodiments of the present invention. The grid computing system 100, described in FIG. 1, is virtually arranged in the configuration 200. The configuration 200 includes a plurality of sets of DPUs 202, 204, 206, and 208. The plurality of sets of DPUs 202, 204, 206, and 208 are formed by sub-grouping the plurality of DPUs 102, 104, 106, 108, 210, 212, 214, 216, 218, 220, 222, and 224 present in the grid computing system 100. A core DPU is elected for each of the plurality of sets of DPUs 202, 204, 206, and 208. Further, each of the plurality of sets of DPUs has a set of data files. As depicted in the figure, the plurality set of DPUs 202, 204, 206, and 208 have sets of data files 226, 228, 230, and 232 respectively. Each set of data files 226, 228, 230, and 232 include data files stored at each DPU in the set of DPUs. Data files from the sets of data files are used by plurality of computation jobs for processing.

In an initial step, DPUs from the plurality of DPUs 102, 104, 106, 108, 210, 212, 214, 216, 218, 220, 222, and 224 are appointed as core DPUs, based on the readiness of a DPU to become the core DPU. According to one embodiment of the present invention, DPUs 102, 104, 106, and 108 are the core DPUs for the sets of DPUs 202, 204, 206, and 208, respectively. The core DPUs carry information that includes information about set of data files present with each DPU from the set of DPUs. For example, DPU 102, which is a core DPU for set of DPU 202, carries information about data files present at DPUs 210, 212, and itself. Further, the plurality of sets of DPUs 202, 204, 206 and 208 communicate between each other via the core DPUs 102, 104, 106, and 108.

Once core DPUs are elected, other DPUs from the plurality of DPUs, namely, DPU 210, 212, 214, 216, 218, 220, 222, and 224 get added the plurality of sets of DPUs 202, 204, 206, and 208, which are headed by the core DPUs 102, 104, 106, and 108. This addition is conducted based on the closeness of a DPU to the core DPUs 102, 104, 106, and 108. A DPU from 210, 212, 214, 216, 218, 220, 222, and 224, for example DPU 210, is said to be close to the core DPU 102 when minimum bandwidth of a path from the DPU 210 to the core DPU 102 is maximum among bandwidth of all available paths from the DPU 210 to other core DPUs 104, 106, and 108. However, the core DPUs 102, 104, 106, and 108 decide which DPUs from the other DPUs in the grid computing system 100 should be allowed to join the set of DPUs 202, 204, 206, and 208 they head. According to one embodiment of the present invention, the core DPU 102 may reject the DPU 210 in case the set of DPUs 202 already has a maximum number of DPUs added to it.

After DPUs in the plurality of sets of DPUs 202, 204, 206, and 208 are finalized, the grid computing system 100 schedules the plurality of computation jobs at the plurality of sets of DPUs 202, 204, 206, and 208. A method for scheduling the plurality of computation jobs in the grid computing system will be described in conjunction with FIG. 4. Further, scheduling information about the plurality of computation jobs is stored at the core DPUs 102, 104, 106, and 108. For example, when one computation job from the plurality of computation jobs is scheduled at the DPU 210, this information, along with data files used by the computation job, is stored at the core DPU 102 that heads the set of DPUs 202. Based on the scheduling information stored at each of the core DPUs 102, 104, 106, and 108 DPUs in the plurality of sets of DPUs 202, 204, 206, and 208 are changed. A method for managing the plurality of sets of DPUs 202, 204, 206, and 208 in the grid computing system 100 will be described in conjunction with FIG. 7.

Figure 3:
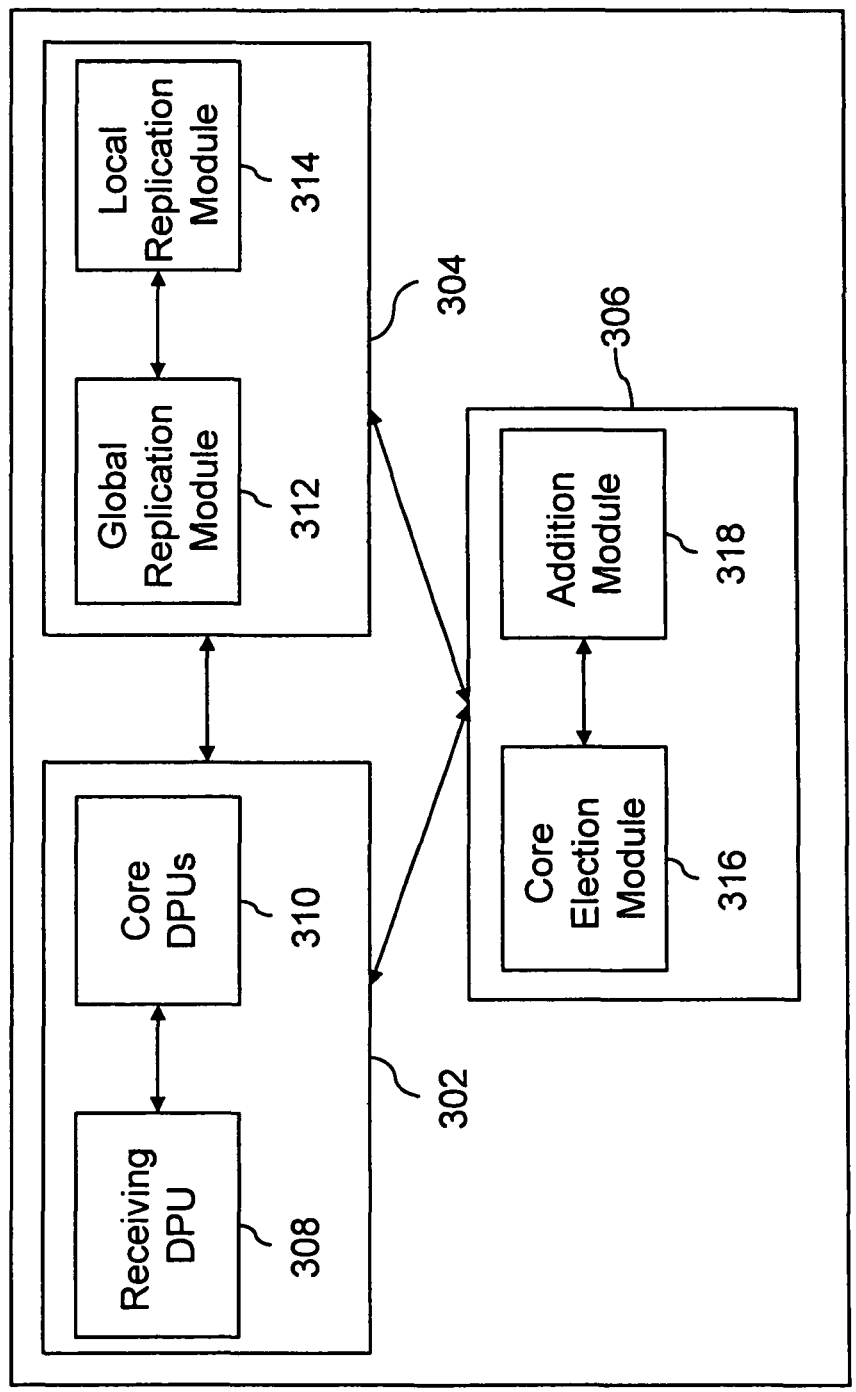
FIG. 3 illustrates a schematic block diagram of a system for scheduling a plurality of computation jobs in the grid computing system and managing the grid computing system, in accordance with an embodiment of the present invention.

FIG. 3 illustrates a schematic block diagram of a system for scheduling a plurality of computation jobs in the grid computing system 100 and managing the grid computing system 100, in accordance with an embodiment of the present invention. The system includes a scheduling module 302, a replication module 304, and a grid management module 306. The scheduling module 302 receives plurality of computation jobs from the users 110, 112, 114 and schedules the plurality of computation jobs to the plurality of DPUs 102, 104, 106, and 108 in the grid computing system 100. The replication module 304 replicates data files present at a DPU from the grid computing system 100 to other DPUs in the grid computing system 100 based on scheduling of the plurality of computation jobs in the grid computing system 100. The grid management module 306 initializes and manages a plurality of sets of DPUs, described in conjunction with FIG. 2, in the grid computing system 100. The grid management module 306 initially elects DPUs as core DPUs in the grid computing system, adds DPUs to these core DPUs to form plurality of sets of DPUs. Further, the module 306 manages the plurality of sets of DPUs based on scheduling of computation jobs in the grid computing system, information of which is stored at the core DPUs. During management of the plurality of sets of DPUs, the grid management module 306 may delete DPUs from one of the plurality of sets of DPUs and add these DPUs to another set of DPUs.

According to one embodiment of the present invention, the scheduling module 302 includes a scheduling DPU 308. The scheduling DPU 308 receives the plurality of computation jobs submitted by the plurality of users 110, 112, and 114. The scheduling DPU 308 also stores information in a history table about each of the plurality of sets of DPUs 202, 204, 206, and 208 present in the grid computing system 100. The history table information includes, but is not limited to, information about the plurality of computation jobs being submitted, information about sets of data files present at each of the plurality of sets of DPUs 202, 204, 206, and 208, and scheduling information for each of the plurality of computation jobs. Hereinafter, a first computation job from the plurality of computation jobs is considered for the purpose of simplifying the description.

Further, the scheduling DPU 308 schedules the first computation job at one of the plurality of sets of DPUs 202, 204, 206, and 208. According to one embodiment of the present invention, the first computation job is scheduled at a first set of DPUs 202 by the scheduling DPU 308 based on first scheduling criteria. The first scheduling criteria, according to one embodiment, includes, scheduling the first computation job at the first set of DPUs 202 when a cost for scheduling the first computation job at the first set of DPUs 202 is least among cost of scheduling the first computation job at all of the plurality of sets of DPUs in the grid computing system 100. An algorithm to calculate cost of scheduling the first computation job at the plurality of sets of DPUs will be explained in detail in conjunction with FIG. 4.

Further, the scheduling module also includes a set of core DPUs 310. The set of core DPUs 310 includes core DPUs of each of the plurality of sets of DPUs 202, 204, 206, and 208. According to one embodiment, the set of core DPUs 310 includes a first core DPU 102 that heads the first set of DPUs 202, a second core DPU 104 that heads a second set of DPUs 204, a third core DPU 106 that heads a third set of DPUs 206, and a fourth core DPU 108 that heads a fourth set of DPUs 208, described earlier in conjunction with FIG. 2. Once the scheduling DPU 308 schedules the first computation job at the first set of DPUs 202, this information is conveyed to the first core DPU 102. The first core DPU, a part of the set of core DPUs 310, then schedules the first computation job at one DPU in the first set of DPUs 202. The scheduling decision by the first core DPU 102 is based on second scheduling criteria. The second scheduling criteria includes, scheduling the first computation job at a DPU in the first set of DPUs 202 that has least cost of scheduling the first computation job. According the one embodiment, a first DPU 210 in the first set of DPUs 202 has the least cost of scheduling the first computation job.

Further, each of the set of core DPUs has a demand matrix stored in its memory. For example, the first core DPU 102 has a first demand matrix stored in its memory/disk. The first demand matrix stores information that includes, but is not limited to, information about computation jobs from the plurality of computation jobs being scheduled at the first set of DPUs 202, and information about set of data files present at each DPU from the first set of DPUs 202. The information stored in the first demand matrix is used by the first core DPU 202 to calculate the cost of scheduling the first computation job at each DPU from the first set of DPUs 202.

Further, the replication module 304 also includes a global replication module 310 and a local replication module 312. The global replication module 310 replicates data files from one set of DPUs to other set of DPUs in the grid computing system 100. For example, the global replication module replicates one of a first set data files present at the first set of DPUs 202 to a DPU to the second set of DPUs 204. The communication between the first set of DPUs 202 and the second set of DPUs 204 happens via the first core DPU 102, and the second core DPU 104. The global replication module 310 replicates data files from one set of DPUs to other based on scheduling information stored in the history table located in the memory/disk of the scheduling DPU 308. A method for replication of data files from one set of DPUs to other will be described in greater detail with the help of FIG. 5.

The local replication module 312 on the other hand replicates data from one DPU to other in a set of DPUs from the plurality of sets of DPUs. For example, the local replication module replicates data files present at the first DPU 210 to a second DPU 212, in the first set of DPUs 202. The local replication module 312 uses data stored in the demand matrix of core DPUs, here the first core DPU 102, to replicate data within the set of DPUs. A method for replication of data files within a set of DPUs will be explained along with the aid of FIG. 6.

According to yet another embodiment of the present invention, the grid management module 306 includes a core election module 314 and an addition module 316. The core election module 314 elects core DPUs for each of the plurality of sets of DPUs in the grid computing system 100. As described along with FIG. 2, initially the core election module 214 elects core DPUs based on the readiness of DPUs to become the core DPUs. For example, initially in the configuration 200, DPUs 102, 104, 106, and 108 are elected as the core DPUs. On initial election core DPUs, other DPUs from the plurality of DPUs, namely, DPU 210, 212, 214, 216, 218, 220, 222, and 224 are added to the core DPUs 102, 104, 106, and 108 to form the plurality of sets of DPUs 202, 204, 206, and 208.

Further, the addition module 316 picks DPUs from one of the plurality of sets of DPUs and adds them to other sets of DPUs based on the scheduling information stored in the history table at the scheduling DPU 308 and the demand matrix stored at each of set of core DPUs. The addition module 316 further informs the respective core DPUs of the addition and deletion of DPUs from the sets of DPUs. On addition of new DPU/s to a set of DPUs, initial core DPU for that set of DPUs may not remain the optimal choice for being the core DPU. The core election module 314 then re-elects a new core DPU for that set of DPUs based on a calculation of bandwidths that was described in conjunction with FIG. 2. Further, a method for managing the plurality of DPUs in the grid computing system 100 will be described with the help of FIG. 7.

Figure 4:
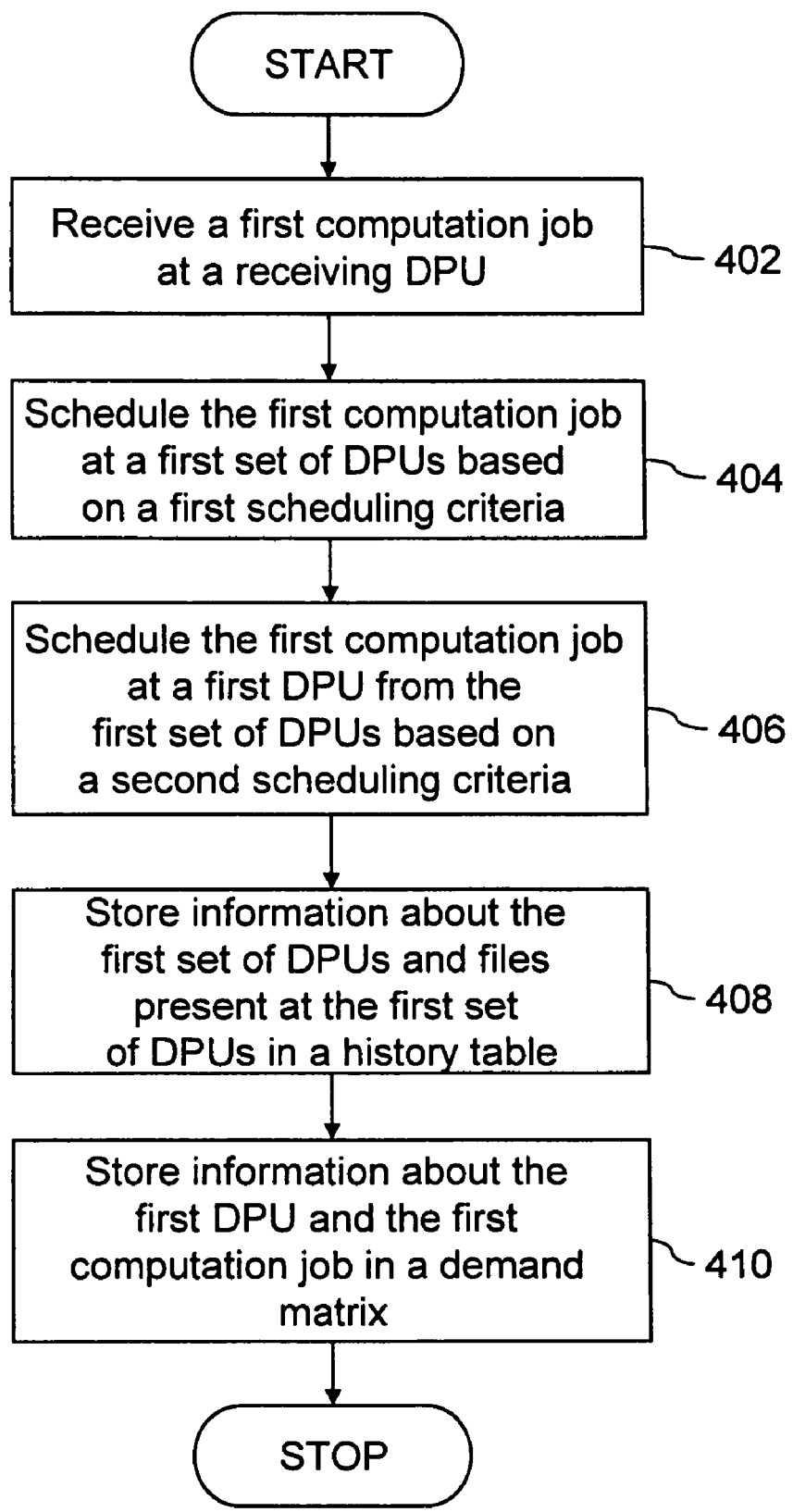
FIG. 4 is a flow chart illustrating a method of scheduling plurality of computation jobs in the grid computing system, in accordance with an embodiment of the present invention.

FIG. 4 is a flow chart illustrating a method of scheduling plurality of computation jobs in the grid computing system 100, in accordance with an embodiment of the present invention. For purpose of simplification, the method as illustrated in FIG. 4 will be explained taking the help of elements in FIGS. 1, 2, and 3. At step 402, a scheduling DPU, for example the scheduling DPU 308, receives a first computation job from the plurality of computation jobs from one of plurality of users, in the grid computing system 100. At step 404, the scheduling DPU schedules the first computation job at a first set of DPUs, for example the set of DPUs 202, based on first scheduling criteria. The grid computing system 100 with plurality of DPUs is rearranged to the configuration 200, described in conjunction with FIG. 2. The configuration 200 includes a plurality of sets of DPUs 202, 204, 206, and 208 that are formed by sub-grouping plurality of DPUs 102, 104, 106, 108, 210, 212, 214, 216, 218, 220, 222, and 224. Each of the plurality of DPUs has a core DPU elected. For example, DPUs 102, 104, 106, and 108 are appointed as core DPUs for the sets of DPUs 202, 204, 206, and 208 respectively. At step 406, a first core DPU of the first set of DPUs schedules the first computation job at a first DPU from the first set of DPUs, for example DPU 210 from the set of DPUs 202, based on second scheduling criteria. Further, at step 408, the scheduling DPU stores information about the first computation job being scheduled at the first set of DPUs and set of data files present at the first set of DPUs in a history table. The history table is stored in the memory/disk of the scheduling DPU. Finally, at step 410, the first core DPU stores information about the first computation job being scheduled at the first DPU, number of times a file from a set of data files present at the first DPU is being used by computation jobs scheduled at the first set of DPUs and other set of DPUs, and a first set of input data files required by the first computation job in a demand matrix. The first core DPU stores the demand matrix in its memory.

According to one embodiment of the present invention, the first scheduling criteria includes scheduling the first computation job at the first set of DPUs when the first set of DPUs has a least cost of scheduling the first computation job. The cost of scheduling the first computation job at the first computation job is calculated, according to one method, by calculating number of computation jobs scheduled and being processed at the first set of DPUs, time required to move at least one file from the first set of input data files to the first set of DPUs when the at least one file is not present with the first set of DPUs, and an average processing time for the first computation job at each DPU in the first set of DPUs based on processing power of each DPU in the first set of DPUs. To calculate the time required to move the at least one file from the first set of input data files that is not present with the first set of DPUs, each DPU from the first set of DPUs is checked for the availability of files from the first set of input data files. This is performed with the help of information stored in the demand matrix stored at the first core DPU.

The number of computation jobs being scheduled and processed at the first set of DPUs is used to calculate a multiplicative factor (M). The multiplicative factor ($M_1$) for the first set of DPUs is calculated as follows:

$$M_1 = \frac{q + \alpha \overline{q}}{q + \overline{q}} \quad (1)$$

where, q=number of computation jobs being scheduled and being processed at the first set of DPUs;

$\overline{q}$=average number of computation jobs scheduled and being processed at the plurality of sets of DPUs in the grid computing system 100; and α=a configurable constant.

The multiplicative factor ($M_1$) captures the effect of number of jobs scheduled and being processed at the first set of DPUs and the grid computing system 100. Further, total time required to process the first computation job at a DPU in the first set of DPUs, or a job latency ($L_1$) associated with the first computation job in the first set of DPUs is calculated as follows:

$$L_1 = \sum_{i=1}^{n} \sum_{j=1}^{k} \Delta_{ij} + \sum_{i=1}^{n} \omega_i \quad (2)$$

Where, $\Delta_{ij}$=time required to move a file 'j' from the first set of input data files that is unavailable with DPUs in the first set of DPUs, to a DPU 'i' in the first set of DPUs $\omega_i$=time required to process the first computation job at a DPU 'i' in the first set of DPUs Eq. 2 sums time required to move at least one file 'j' unavailable with DPUs in the first set of DPUs to each DPU in the first set of DPUs.

Further, the cost of scheduling ($C_1$) the first computation job at the first set of DPUs, for example set of DPUs 102, is calculated by multiplying Eq. 1 with Eq. 2 as follows:

$$C_1 = L_1 M_1 \quad (3)$$

Eq. 3 shows that the cost of scheduling the first computation job at the first set of DPUs is dependent on the time required to process the first computation job at a DPU from the first set of DPUs and the number of computation jobs scheduled and being processed at the first set of DPUs. The selection of 'α' in Eq. 1 determines what is given more importance over the other. In case $$\frac{q}{\bar{q}} = 0$$

for the first set of DPUs, for example the set of DPUs 202, the cost of scheduling the first computation job from Eq. 3 becomes $C_1=L_1 \cdot \alpha$. Thus, fixing a low value for α ensures that the cost of scheduling the first computation job at the first set of DPUs is the least and hence the first computation job gets scheduled at the first set of DPUs. The value of α is used to tune the grid computing system 100 to optimize the scheduling of the plurality of computation jobs received from the plurality of users, for example the users 110, 112, and 114.

According to one embodiment of the present invention, the second scheduling criteria considered at step 406 of the method illustrated in FIG. 4 includes scheduling the first computation job at the first DPU from the first set of DPUs, such as DPU 210 from the set of DPUs 202, when the first DPU has least cost of scheduling the first computation job. The cost of scheduling the first computation job at the first DPU is calculated using a multiplicative factor ($M_{11}$) obtained using Eq. 1, where q=no. of jobs scheduled and being processed at the first DPU in the first set of DPUs; $\bar{q}$=average number of computation jobs scheduled and being processed at each DPU from the first set of DPUs. For the purpose of calculation of the cost of scheduling the first computation job at the first DPU, Eq. 2 is modified as follows:

$$L_{11} = \sum_{j=1}^{k} \Delta_j + \omega_{11}$$

where, $\Delta_j$=time required to move a file 'j' from the first set of input data files, from a DPU in the grid computing system 100 to the first DPU, when the file 'j' is unavailable with the first DPU; and $\omega_{11}$=time required to process the first computation job at the first DPU in the first set of DPUs.

Eq. 3 is now used to calculate the cost ($C_{11}$) of scheduling the first computation job at the first DPU from the first set of DPUs.

According to yet another embodiment of the present invention, the history table present at the scheduling DPU, for example the scheduling DPU 308 as described in FIG. 3, stores scheduling information for each of the plurality of computation jobs. Further, the history table information also includes sets of data files present at each of the plurality of sets of DPUs.

Further, the demand matrix stored at the first core DPU, such as the core DPU 102 for the set of DPUs 202, has information relating to number of times a file from set of data files present at the first DPU is being used by computation jobs scheduled at the first set of DPUs and other set of DPUs. This number is termed as a 'demand' (D) for the file present at the first DPU. Based on the demand calculated for each file present in the grid computing system 100, a normalized demand ($\eta_j$) is calculated for a file 'j' present at the first DPU, using the following equation:

$$\eta_j^1 = \frac{\sum_{i=1}^{n} D_j}{\sum_{i=1}^{n} \sum_{j=1}^{x} D_{ij}} \quad (4)$$

The numerator term in Eq. 4 gives the total demand for the file present at the first DPU at each DPU from the plurality of DPUs in the grid computing system 100. Whereas, the denominator term in Eq. 4 results in total demand for all files present in the grid computing system 100 at each DPU from the plurality of DPUs in the grid computing system 100. The normalized demand (η) for each file present at the first DPU is calculated and stored in the demand matrix. Further, the normalized demand for each set of data files present at each of the plurality of sets of DPUs present in the grid computing system 100 is stored in the history table. This information is used in the method of replication of data files in the grid computing system 100, described in greater detail along with FIGS. 5 and 6.

Further, the scheduling DPU terminates scheduling of any new computation job from the plurality of computation jobs at the first DPU when the scheduling of the first computation job makes the number of jobs scheduled and being processed at the first DPU equal to a maximum threshold. The maximum threshold is configurable and can be set by a system administrator.

Figure 5:
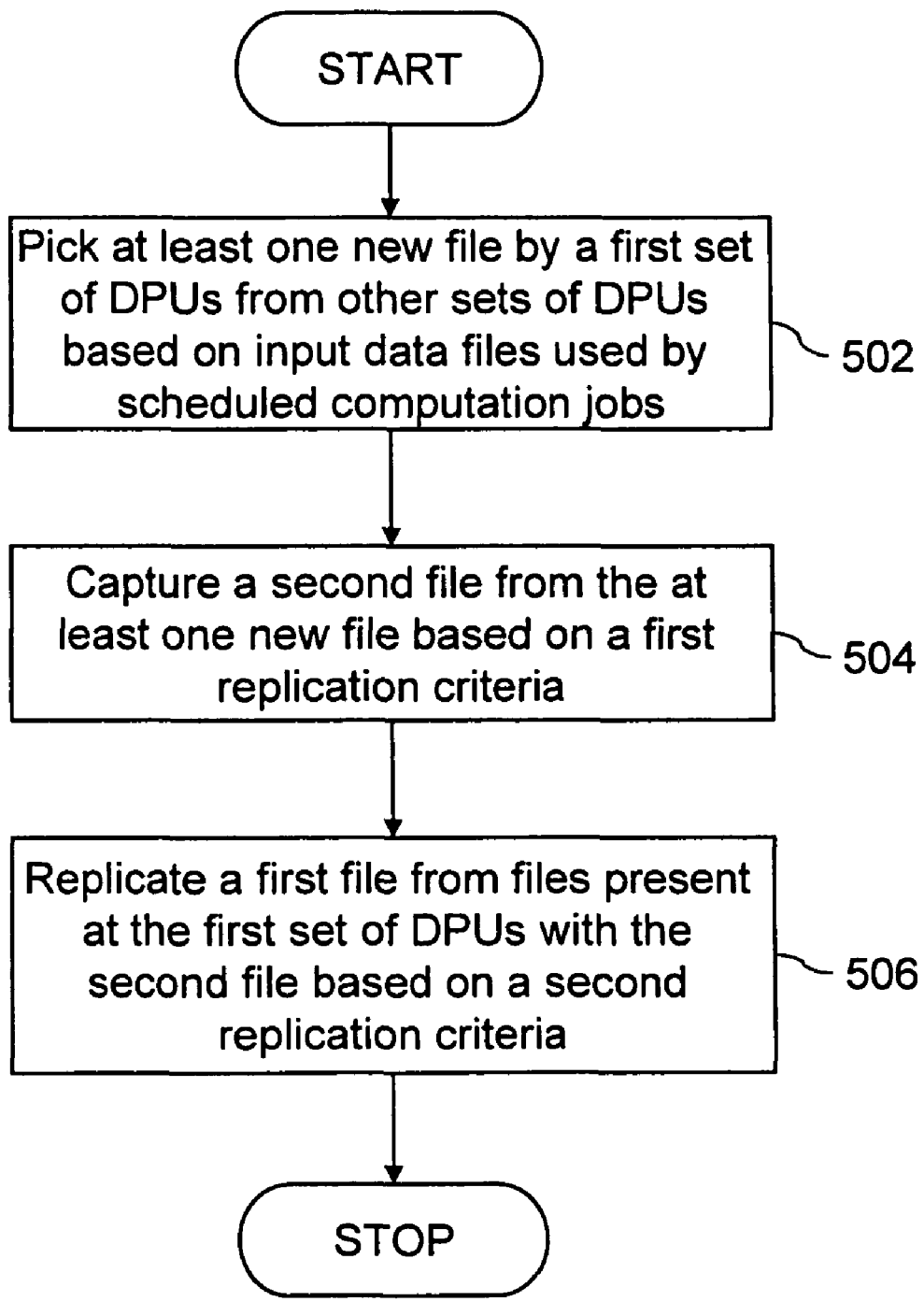
FIG. 5 is a flow chart illustrating a method for replication of data available in the grid computing system, in accordance with an embodiment of the present invention.

Referring now to FIG. 5, which is a flow chart illustrating a method for replication of data available in the grid computing system 100, in accordance with an embodiment of the present invention. More particularly, referring to the configuration 200 explained in conjunction with FIG. 2, the flow chart illustrated in FIG. 5 illustrates a method for replication of data available with one set of DPUs, for example set of DPU 202, to other sets of DPUs, such as sets of DPUs 204, 206 and 208, in the grid computing system 100. Further, a plurality of computation jobs are scheduled for processing at each of the plurality of sets of DPUs. Each of the plurality of computation jobs require a set of input data files for processing. These sets of input data files are available with plurality of DPUs in the grid computing system 100.

The method starts at step 502, when a first set of DPUs picks at least one new file from other sets of DPUs based on sets of input data files used by at least one computation job from the plurality of computation jobs that is scheduled for processing at the first set of DPUs. The first and second sets of DPUs communicate with each other via a first and a second core DPU, for example, set of DPUs 202 communicates with set of DPUs 204 through core DPUs 102 and 104. Further, at step 504, the first set of DPUs captures a second file from the at least one new file based on first replication criteria. The second file belongs to a second set of data files present at a second set of DPUs, for example set of DPUs 204. Furthermore, at step 506, the first core DPU replaces a first file from a first set of data files present at the first set of DPUs with the second file based on second replication criteria.

According to one embodiment of the present invention, the first replication criteria includes a step of checking number of computation jobs scheduled at the first set of DPUs that require the second file for processing. The second file is captured from the second set of DPUs, when the second file has a non-zero demand ($\eta_2^1$) at the first set of DPUs. Demand for the second file at the first set of DPUs is calculated using information stored in history table at a scheduling DPU, for example the scheduling DPU 308, and the Eq. 4, explained in conjunction with FIG. 4. The information present at the history table includes information about computation jobs being scheduled at each of the plurality of sets of DPUs, and data files present at each of the plurality of sets of DPUs. This information is stored whenever a new computation job is scheduled at a set of DPUs from the plurality of sets of DPUs.

On capturing the second file from the second set of data files, the first core DPU checks each DPU from the first set of DPUs to store the second file at one DPU in the first set of DPUs. According to one embodiment of the present invention, the first core DPU checks if the second replication criteria is satisfied, the second replication criteria including checking whether number of data files in the first set of data files is greater than or equal to a maximum number of data files. When the number of data files in the first set of data files is more than the maximum number of data files, the first core DPU replaces the first file from the first set of data files with the second file. Prior to replacing, the second replication criteria also includes checking whether the DPU that has the first file stored in its memory/disk is the owner of the first file. An owner of a file is a DPU in the grid computing system 100 where the file never gets replaced in the process of replication. Hence, when number of data files in the first set of data files is greater than or equal to the maximum number of data files and none of the DPUs in the first set of DPUs owns the first file, the first file is replaced with the second file. Furthermore, when the first file is owned by the first set of DPUs or when the first file has more demand ($\eta_1^1$) than the demand for the second file at the first set of DPUs ($\eta_2^1$) i.e. $\eta_1^1 \geq \eta_2^1$ another file from the first set of data files is searched to be replaced by the second file. In case the number of files in the first set of data files is greater than or equal to the maximum number of data files and the first core DPU finds no file from the first set of data files to be replaced, the second file is rejected and the first set of DPUs captures another new file from the at least one new file picked at step 502. Further, when the number of files in the first set of data files is less than the maximum number of data files the first core DPU checks whether any DPU from the first set of DPUs has enough space in its memory/disk to store the second file. The second file is stored in the first DPU when the first DPU has enough space in its memory/disk to store the second file without replacing the first file.

Figure 6:
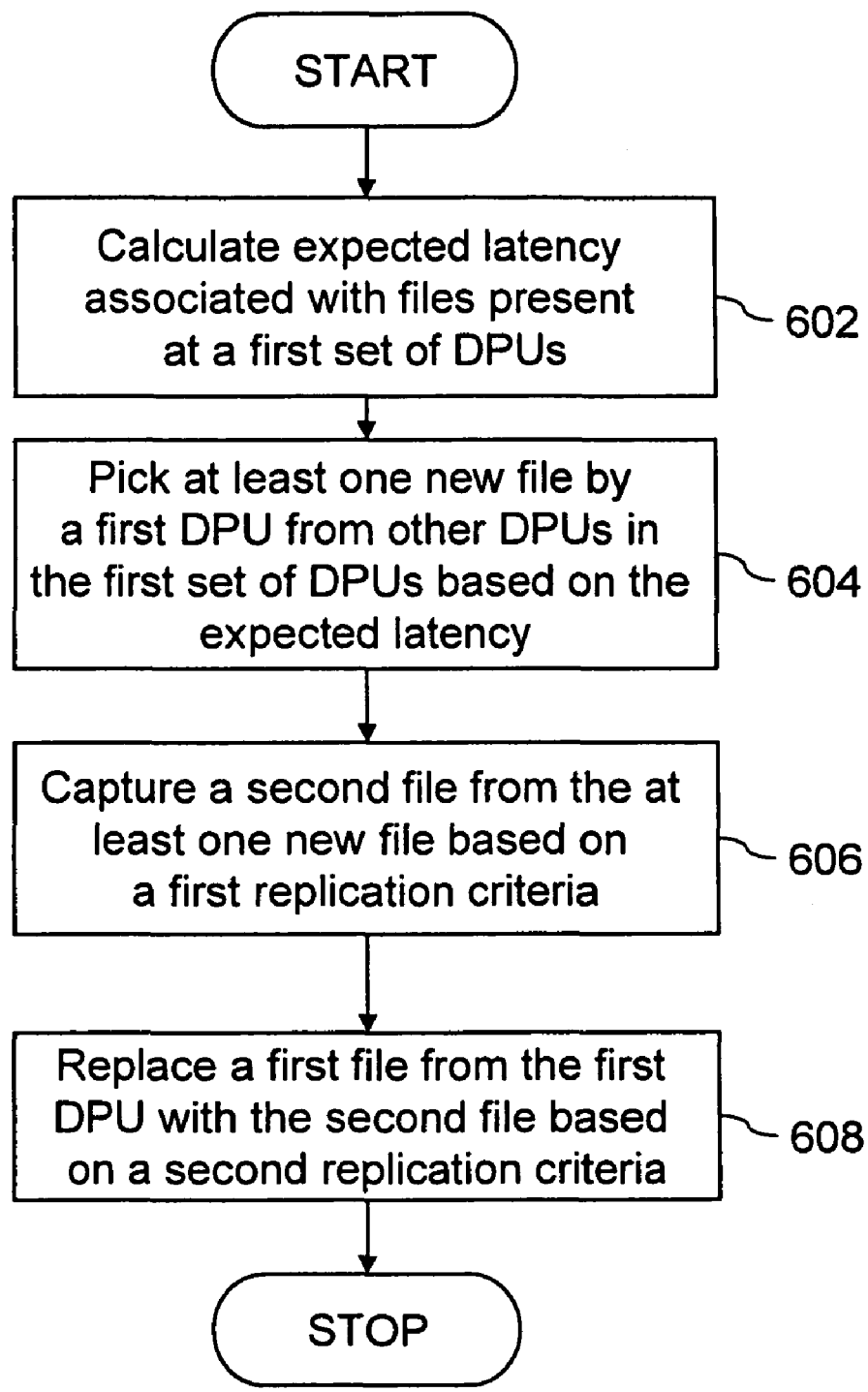
FIG. 6 is a flow chart illustrating another method for replication of data in the grid computing system, in accordance with another embodiment of the present invention.

Data files from the first set of DPUs that are present at one DPU can be moved to another DPU in the first set of DPUs. A method to replicate files from one DPU in a set of DPUs to other DPUs in the set of DPUs is explained in FIG. 6. FIG. 6 illustrates a flow chart that describes a method for replication of data available in the grid computing system 100, in accordance with another embodiment of the present invention.

The method starts, at step 602, by calculating an expected latency for each file in a first set of data files present with a first DPU in a first set of DPUs, for example the DPU 210 in the set of DPUs 202. This calculation is performed by first core DPU, for example the core DPU 102 in the set of DPUs 202. At step 604, the first DPU picks at least one new file from other DPUs in the first set of DPUs based on the expected latency for each file in the first set of data files. Further, at step 606, a second file from the at least one new file stored in a second DPU in the first set of DPUs is captured by the first core DPU when the expected latency of the second file is less than maximum expected latency among files present at the first DPU. Finally, at step 608, a first file from the first set of data files is replaced with the second file when the first DPU has number of data files equal to a maximum number of data files.

According to one embodiment of the present invention, the step of calculating the expected latency for data files in the first set of data files present at the first DPU includes calculating a probability (P) of each computation job from plurality of computation jobs submitted to the grid computing system 100 by plurality of users, for example users 110, 112, and 114 as depicted in FIG. 1, that gets scheduled at one DPU from the first set of DPUs using a file from the first set of data files. The probability is calculated based on scheduling information stored in demand matrix at the first core DPU at the time of scheduling as described in conjunction with FIG. 4. Further, time (T) required to move the file from the first DPU to other DPUs in the first set of DPUs is also calculated. The expected latency ($\delta_{11}$) for a file F1 at the first DPU, for example the DPU 210 in the set of DPUs 202, is calculated using the following equation:

$$\delta_{11} = \sum_{i=1}^{k} P_{1i} \times T_{1i} \tag{5}$$

where, $P_{1i}$=probability of a computation job scheduled at a DPU 'i' in the first set of DPUs using the file F1; and $T_{1i}$=time required to move the file F1 from the first DPU to the DPU 'i'.

Referring to FIG. 2, which depicts the configuration 200, with exemplary data files present at each of the plurality of sets of DPUs and each DPU in the grid computing system 100, assume, for example, that probability of file 'F1' present at the DPU 210 in the set of DPUs 202 being used by jobs scheduled at the core DPU 102 is 0.2, at the DPU 210 is 0.5, and at the DPU 212 is 0.3. Further, the time taken to move the file 'F1' from the DPU 210 to the DPUs 102 and 212 is 2 seconds, and 3 seconds respectively. Using Eq. 5, expected latency for the file 'F1' is calculated as (0.2*2+0.3*3+0*0.5)=1.3 seconds.

On calculation of expected latency for each file in the first DPU, the first core DPU contacts other DPUs in the first set of DPUs and picks at least one new file that has expected latency less than the maximum expected latency in the first DPU. The second file that is captured from the at least one new file has a least expected latency among the at least one new file. Further, the first file is replaced with the second file when number of data files in the first set of data files is more than or equal to the maximum number of data files, the first file has the maximum expected latency in the first DPU, and the first file is not owned by the first DPU. When the number of files in the first set of data files is less than the maximum number of data files the first core DPU checks whether the DPU has enough space in its memory/disk to store the second file. The second file is stored in the first DPU when the first DPU has enough space in its memory/disk to store the second file without replacing the first file.

Furthermore, the first DPU replaces a third file from the first set of data files with the second file, when the first DPU is an owner of the first file. The third file has an expected latency less than the maximum expected latency among the first set of data files, but the expected latency of the third file is more than that of the second file.

Figure 7:
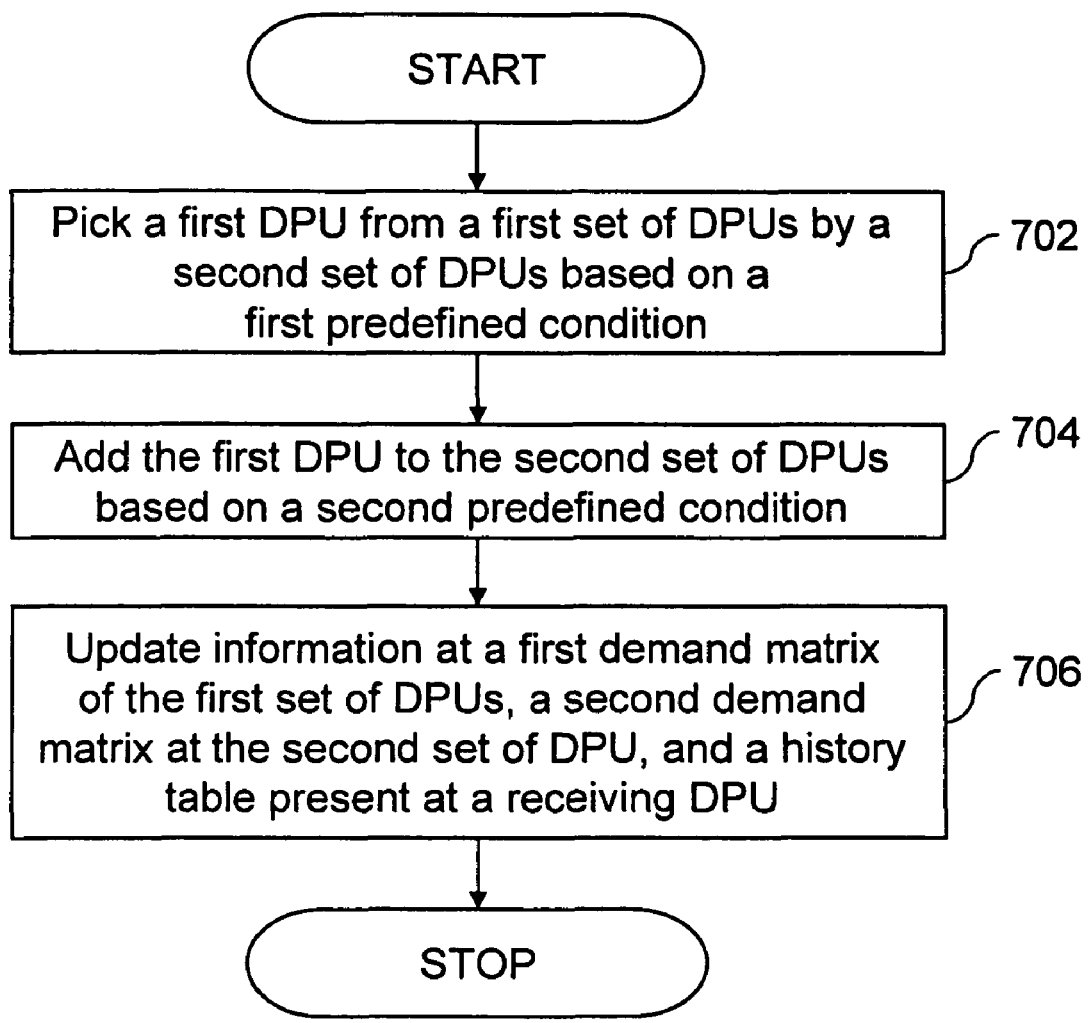
FIG. 7 is a flow chart illustrating a method for clustering and managing a plurality of data processing units (DPUs) in the grid computing system, in accordance with yet another embodiment of the present invention.

FIG. 7 is a flow chart illustrating a method for clustering and managing a plurality of data processing units (DPUs) in the grid computing system 100, in accordance with yet another embodiment of the present invention. The grid computing system 100 as described in conjunction with FIG. 1 has a plurality of DPUs 102, 104, 106, and 108. A plurality of computation jobs submitted by plurality of users 110, 112, and 114 are received by a scheduling DPU 308. According to one embodiment of the present invention, the grid computing system 100 is arranged in configuration 200 depicted in FIG. 2. The grid management module 306, explained with FIG. 3, arranges the grid computing system 100 in the configuration 200. The plurality of computation jobs are scheduled for processing at plurality of sets of DPUs 202, 204, 206, and 208, described in conjunction with FIG. 2, based on set of data files present at them. According to one embodiment of the present invention, method described in flowchart depicted in FIG. 4 is used to schedule the plurality of computation jobs in the grid computing system 100. On scheduling, data files at one DPU in the system 100 that are used by other DPU in the system 100 are replicated on the other DPU. According to one embodiment of the present invention, methods described in conjunction with FIGS. 5 and 6 are used to replicate data in the grid computing system. Based on scheduling on replication, the configuration 200 is managed with the help of the method illustrated in FIG. 7.

The method starts at step 702, where a second set of DPUs picks a first DPU from a first set of DPUs based on a first predefined condition. The communication between the first and second sets of DPUs happens via a first core DPU and a second core DPU. For example, the sets of DPUs 202 and 204 communicate via core DPUs 102 and 104 and the set of DPUs 204 picks DPU 210 from the set of DPUs 202. At step 704, the first DPU is added to the second set of DPUs based on a second predefined condition. Further, at step 706, information about addition of the first DPU to the second set of DPUs is stored in a second demand matrix that is stored at the second core DPU, information about deletion of the first DPU from the first set of DPUs is stored at a first demand matrix that is stored at a first core DPU, and information about changes in the plurality of sets of DPUs is stored at a history table stored in the memory of the scheduling DPU.

According to one embodiment of the present invention, the first predefined condition includes checking whether the second set of DPUs is stronger than the first set of DPUs. A set of DPU is said to be stronger than another set of DPUs when demand for files present at the set of DPU is greater than the demand for files present at the other set of DPUs. Hence, the second set of DPUs is stronger than the first set of DPUs when demand for a second plurality of sets of data files is greater than a demand for a first plurality of sets of data files. Demand for a file is defined as the number of times the file is used by computation jobs being scheduled in the grid computing system 100. Thus, the demand for each of the first and second plurality of sets of data files is calculated using information stored in the first demand matrix and the second demand matrix respectively. Further, the first predefined condition also includes checking whether a maximum limit of number of DPUs has been attained in the second set of DPUs. Furthermore, the first predefined condition also includes checking whether a minimum limit of number of DPUs has been attained in the first set of DPUs. Thus, the second set of DPUs picks the first DPU from the first set of DPUs when the second set of DPUs is stronger than the first set of DPUs, the number of DPUs in the second set of DPUs has not attained the maximum limit, and the number of DPUs in the first set of DPUs has not attained the minimum limit.

According to another embodiment of the present invention, the second predefined condition includes checking whether a utility of the first DPU in the first set of DPUs is least among DPUs present in the first set of DPUs. Utility of a DPU in a set of DPUs is defined as number of times files present at the DPU transferred to other DPUs in the first set of DPUs, multiplied by ratio of number of computation jobs from the plurality of computation jobs that are scheduled at the first set of DPUs with total number of computation jobs scheduled at the first DPU. Number of times a file present at a DPU being transferred to other DPUs is termed as 'called frequency' for the file. Thus, the utility ($U_1$) of the first DPU that has a first set of data files (F1, F2, F3) is calculated as follows:

$$U_1 = \sum_{i=1}^{3} \frac{\beta_{Fi}^1}{\sum_{j \in DPUs}^{3} \beta_F^j} \cdot \frac{J_1}{J} \qquad (6)$$

where, $\beta_{Fi}^1$=called frequency for file '$F_i$' at the first DPU in the first set of DPUs;

$\beta_F^j$=called frequency of each file present at each DPU in the first set of DPUs;

$J_1$=number of computation jobs scheduled at the first DPU; and $J$=number of computation jobs scheduled at the first set of DPUs.

Further, the second predefined condition includes checking whether a new utility of the first DPU when the first DPU is added to the second set of DPUs gets increased above a minimum threshold. Information for the second demand matrix is used to find the called frequency of each of the first set of data files with respect to DPUs present in the second set of DPUs. Using Eq. 6 and corresponding values for the second set of DPUs the new utility for the first DPU is calculated. In case the new utility is more than the minimum threshold the first DPU is added to the second set of DPUs. For example, assume that utility of the DPU 210 in the set of DPUs 202 is 0.33, the minimum threshold is 0.05, and the new utility of the DPU 210 when it gets added to the set of DPUs 204 is 0.40. The new utility is 0.07 greater than the old utility, which in turn is greater than the minimum threshold (0.05) and hence, the DPU 210 gets added to the set of DPUs 204. Calculations involved in obtaining the utility of a DPU are explained in conjunction with FIG. 8.

The first DPU once being added to the second set of DPUs receives new computation jobs from the plurality of computation jobs through the second core DPU. New core DPUs can be elected for the first and second set of DPUs based on bandwidth calculations explained in conjunction with FIG. 3. The new core DPUs are DPUs in the first and second set of DPUs that have a minimum average of minimum bandwidth among all DPUs in the respective sets of DPUs.

Figure 8:
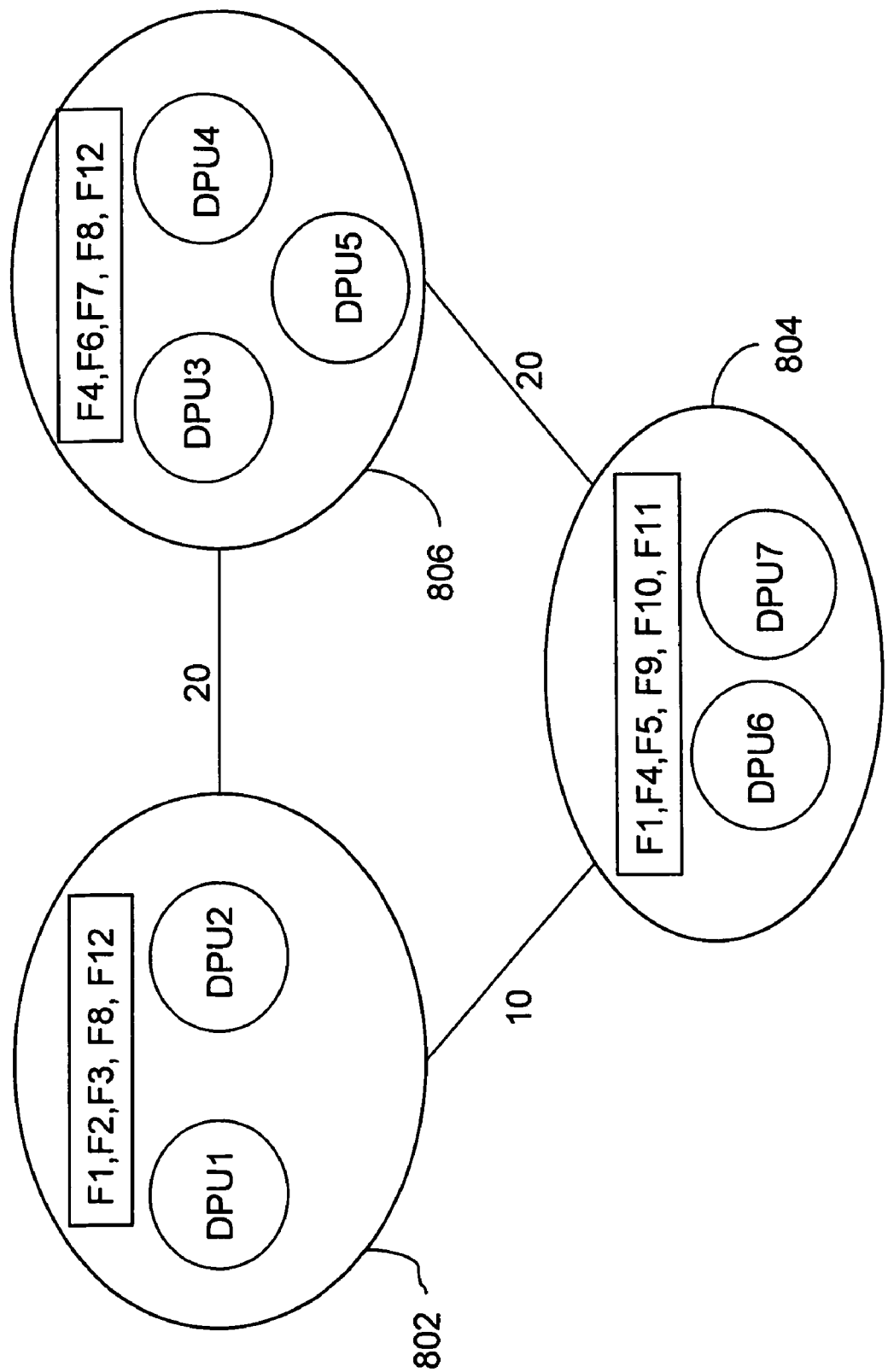
FIG. 8 illustrates details of data file usage at each DPU in the grid computing system, in accordance with an embodiment of the present invention.

FIG. 8 illustrates details of data file usage at each DPU in the grid computing system 100, in accordance with an embodiment of the present invention. After scheduling the plurality of computation jobs at plurality of DPUs, sub-grouped in plurality of sets of DPUs, history table that is stored at the scheduling DPU 308 and demand matrices that are stored at core DPUs of each of the plurality of sets of DPUs store information about data files being used by each of the plurality of computation jobs. This information is used to replicate data and manage the grid computing system 100 as described in conjunction with FIGS. 4, 5, 6, and 7. FIG. 8 will be used to explain calculations that take place while scheduling the plurality of computation jobs and managing the grid computing system 100. As explained with FIG. 4, scheduling a computation job is based on cost of scheduling the computation job at a DPU. Consider a computation job Y that uses data files F1, F4, F6, and F12. The data files may be present with different sets of DPUs in the grid computing system 100. Consider calculating the cost of scheduling the computation job Y at set of DPUs 802. First, time required to move the data files from set of DPUs 804, and 806 is calculated. The numbers by the side of the lines joining the sets of DPUs indicate the time to move a data file from one set of DPUs to the other. The values are calculated considering movement of data files between core DPUs of the sets of DPUs. Latencies (L) to schedule computation jobs at set of DPUs 802, 804 and 806 are 30, 20 and 30 seconds respectively. Q denotes the number of computation jobs scheduled and being processed at each of the sets of DPUs. A multiplicative factor (M) is obtained for each of the sets of DPUs 802, 804, and 806, assuming α=0.1 and using Eq. 1. The multiplicative factors for the sets of DPUs 802, 804, and 806 are 0.46, 0.7, and 0.325 respectively. The cost of scheduling (C) at set of DPUs 802, 804, and 806 are 13.8, 14 and 9.75 respectively, according to Eq. 3. Therefore, in this case, the computation job Y is scheduled at the set of DPUs 806, which also has less number of computation jobs being scheduled and processed. However, it is to be noted that when α=0.5, the multiplicative factor changes to 0.7, 0.8333, and 0.625 for the sets of DPUs 802, 804, and 806 respectively. The cost of scheduling the computation job Y changes to 21, 16.66 and 18.75 respectively. Hence the computation job is scheduled at the set of DPUs 804. Therefore, the performance of the scheduling algorithm depends on the value of α.

To understand calculations performed in the method for managing the grid computing system 100, explained in detail with FIG. 7. The set of DPUs 802 contains two DPUs, namely, DPU1 and DPU2 and the set of DPUs 804 contains three DPUs, namely, DPU3, DPU4, and DPU5. Number of computation jobs being scheduled and processed at the set of DPUs 802 is 150 and that at set of DPUs 804 is 100. Assume that each computation job requires 3 data files for processing. Therefore, the total number of data files required by computation jobs scheduled and processed at the sets of DPUs 802, and 804 is 450 and 300 respectively. Out of the 450 data files required by the computation jobs scheduled at set of DPUs 802, 200 are obtained from set of data files present at DPU1, 175 are obtained from set of data files present at DPU2, and 75 are obtained from sets of data files present at DPU4 that is present in the set of DPUs 804. Further, out of the 300 data files required by the computation jobs scheduled at the set of DPUs 804, 100 data files are obtained from DPU3, 25 from DPU4, and 175 from DPU5. Sum of utilities (U) of DPU1, DPU2, DPU3, DPU4, DPU5 are calculated using above mentioned values and Eq. 6. The utilities (U) are 0.33, 0.23, 0.13, 0.02, and 0.20 respectively. Thus, set of DPUs 802 (sum of utilities=0.56) is stronger than set of DPUs 804 (sum of utilities=0.35). Set of DPUs 802 now picks DPUs from the set of DPUs 802 based on utility of the DPUs DPU3, DPU4, and DPU5 present at the set of DPUs 804 based on utility of the DPUs. As DPU4 has the least utility of 0.02, DPU4 is picked by the set of DPUs 802 and added when the second predefined condition, described with FIG. 7, is satisfied. If DPU4 is added to the set of DPUs 802 its utility changes to 0.1 (Eq. 6). Assuming the minimum threshold to be 0.05, new utility of DPU4 is enough for the DPU4 to be added to the set of DPUs 802.

The method and system for integrated scheduling and replication in a grid computing system offers a trade-off between performance and scalability. The plurality of computation jobs is scheduled in an optimized fashion and hence latency of computation job processing is reduced. As replication is dependent on scheduling of the plurality of computation jobs, data is not replicated centrally to all DPUs in the grid computing system. This minimizes wastage of memory of DPUs in the system. Cost of central replication is high, which is reduced by optimized replication method that is integrated with scheduling.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

While, the following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

Many modifications of the present invention will be apparent to those skilled in the arts to which the present invention applies. Further, it may be desirable to use some of the features of the present invention without the corresponding use of other features.

Accordingly, the foregoing description of the present invention should be considered as merely illustrative of the principles of the present invention and not in limitation thereof.

The invention claimed is:

1. A method for scheduling processing of a plurality of computation jobs in a grid computing system, the grid computing system comprising a plurality of data processing units (DPUs) that are interconnected, each of the plurality of DPUs storing data files in a memory/disk, wherein each of the plurality of computation jobs requires a set of data files for processing, the method comprising:

sub-grouping the DPUs into a plurality of data processing unit (DPU) sets, each DPU set comprising a sub-group of the DPUs in the grid computing system and a core DPU elected from among the sub-group of DPUs based on a pre-determined criteria, the core DPU carrying information relating to data files stored at each DPU within the corresponding DPU set;

receiving a computation job from the plurality of computation jobs at a scheduling DPU;

scheduling the computation job for execution within a first DPU set based on a first scheduling criteria, wherein the step of scheduling for execution within the first DPU set is carried out by the scheduling DPU;

scheduling the computation job for execution at a first DPU within the first DPU set based on a second scheduling criteria, wherein the step of scheduling for execution at the first DPU is carried out by a core DPU corresponding to the first DPU set;

storing at the scheduling DPU, a history table comprising information about at least the first DPU set and data files present within the first DPU set; and storing at each core DPU, a demand matrix comprising information relating to computation jobs scheduled for execution within the corresponding DPU set and information relating to data files present at each DPU within the corresponding DPU set.

2. The method as recited in claim 1, wherein the first scheduling criteria comprises scheduling the computation job at the first DPU set when the first DPU set has a least cost of scheduling the computation job.

3. The method as recited in claim 2, wherein calculating the cost of scheduling the computation job at the first DPU set comprises:

calculating a number of computational jobs scheduled and being processed at each DPU within the first DPU set;

calculating time required to move at least one file from a set of data files required by the computation job, when at least one file from the required set of input data files is not available with any DPU within the first DPU set; and calculating an average processing time of the computation job by each DPU within the first DPU set, based on a processing power of each DPU within the first DPU set.

4. The method as recited in claim 3, wherein the step of calculating time required further comprises checking at each DPU of the first DPU set the availability of the set of data files required by the computation job, the checking being done by comparing information about the required set of data files with the core DPU corresponding to the first DPU set.

5. The method as recited in claim 1, wherein the second scheduling criteria comprises scheduling the computation job at the first DPU within the first DPU set when the first DPU has least cost of scheduling the computation job.

6. The method as recited in claim 5, wherein calculating cost of scheduling first computation job at the first DPU within the first DPU set comprises:

calculating a processing time required to process the computation job at the first DPU;

calculating minimum time required to move at least one file from among the set of data files required by the computation job, and that is not available with the first DPU, to the first DPU from one of the plurality of DPUs in the grid computing system; and calculating a waiting time at the first DPU, based on number of computation jobs scheduled and being processed at the first DPU.

7. The method as recited in claim 1, wherein storing information about the first DPU and the computation job in the demand matrix further comprises:

adding the computation job and information about a set of data files required by the computation job to the demand matrix, wherein information comprising scheduling of the computation job at the first DPU is stored; and calculating a number of times each of the data files present at the first DPU was used by remaining DPUs from the plurality of DPUs in the grid computing system.

8. The method as recited in claim 1, wherein storing information about the first DPU set in the history table further comprises:

storing scheduling information about the plurality of computation jobs;

storing information about data files present within each of the plurality of DPU sets;

calculating a ratio of a demand for a file from among data files present at each DPU within the first DPU set against a total demand for the data files present at each DPU within the first DPU set; and calculating a number of times each file from the data files present at DPUs within the first DPU set is used by other DPUs in the grid computing system.

9. The method as recited in claim 1 further comprising terminating scheduling of any new computation job from the plurality of computation jobs at the first DPU, when scheduling the computation job causes a number of jobs scheduled for and being processed at the first DPU to equal a maximum threshold.

10. A method for replication of data available in a grid computing system, the grid computing system comprising a plurality of data processing units (DPUs) that are interconnected, each of the plurality of DPUs storing data files in a memory/disk, a plurality of computation jobs being scheduled for processing at the plurality of DPUs in the grid computing system, the method comprising:

sub-grouping the DPUs into a plurality of data processing unit (DPU) sets, each DPU set comprising a sub-group of the DPUs in the grid computing system and a core DPU elected from among the sub-group of DPUs based on a pre-determined criteria, the core DPU carrying information relating to data files located at each DPU within the corresponding DPU set;

selection of at least one new data file by a first DPU set, wherein the at least one new data file is selected from among data files available within other DPU sets, wherein a core DPU corresponding to the first DPU set communicates with core DPUs corresponding to each of the other DPU sets, and wherein the at least one new data file is selected based on a set of data files required by computation jobs scheduled at the first DPU set;

capturing a second data file from the at least one new data file based on a first replication criteria, wherein the second data file is selected from among data files located within a second DPU set; and replacing a first file from data files present at a DPU within the first DPU set with the second data file, based on a second replication criteria.

11. The method as recited in claim 10, wherein the first replication criteria comprises checking the number of computation jobs scheduled at the first DPU set that require the second data file for processing.

12. The method as recited in claim 11 further comprising capturing the second data file from the second DPU set when the second data file has a non-zero demand at the first DPU set.

13. The method as recited in claim 10, wherein the second replication criteria further comprises:

checking whether a number of data files that are stored at the first DPU set is greater than or equal to a maximum number of data files; and checking whether the DPU in the first DPU set is an owner of the first data file being replaced, wherein ownership of a data file prevents replacement of such file at the owner DPU during the replication process.

14. The method as recited in claim 13, wherein demand posed by computation jobs scheduled at the first DPU set, for the first data file present at a DPU within the first DPU set is less than corresponding demand for the second data file.

15. The method as recited in claim 13, wherein the first data file is never deleted from the DPU in the first DPU set when the DPU in the first DPU set owns the first data file.

16. The method as recited in claim 13, wherein the second data file replaces the first data file when the number of data files at the first DPU set is less than the maximum number of data files, and the DPU in the first DPU set is not the owner of the file.

17. The method as recited in claim 13, further comprising searching for another data file within the first DPU set with maximum number of data files to be replaced by the second data file when demand for the first data file is more than demand for the second data file in the first DPU set or the DPU in the first DPU set is the owner of the first file.

18. The method as recited in claim 13, further comprising rejecting the second data file when no file from the data files present at the DPU within the first DPU set and that is not owned by any DPU from the first DPU set has a demand less than the demand for the second data file.

19. The method as recited in claim 10, wherein the step of seeking the at least one new data file by the first DPU set further comprises accessing information in a history table stored in a scheduling DPU, wherein the information in the history table comprises a list of computation jobs scheduled at each of the DPU set and a list of files stored in each of the DPU sets.

20. A method for replication of data in a grid computing system, the grid computing system comprising a plurality of data processing units (DPUs), each of the plurality of DPUs having a set of data files stored in a memory/disk, wherein a plurality of computation jobs are scheduled for processing at each of the plurality of DPUs, and wherein scheduling the plurality of computation jobs is based on the data files present at each of the plurality of DPUs, the method comprising:

sub-grouping the DPUs into a plurality of data processing unit (DPU) sets, each DPU set comprising a sub-group of the DPUs in the grid computing system and a core DPU elected from among the sub-group of DPUs based on a pre-determined criteria, the core DPU carrying information relating to data files located at each DPU within the corresponding DPU set;

calculating an expected latency associated with each data file from among data files located at a first DPU in the grid computing system, wherein the first DPU is a part of a first DPU set;

selection of at least one new data file by the first DPU from among data files available at other DPUs within the first DPU set based on the expected latency associated with each data file from the data files located at a first DPU;

capturing a second data file from the at least one new data file at a second DPU within the first DPU set when expected latency of the second data file at the second DPU is less than a maximum expected latency for data files from among the data files located in the first DPU; and replacing a first data file in the first DPU with the second data file when number of data files located at the first DPU is equal to or greater than a maximum allowable number of data files.

21. The method as recited in claim 20, wherein the step of calculating the expected latency of a data file from among the data files located in the first DPU further comprises:

calculating a probability of each computation job from the plurality of computation jobs being scheduled at one DPU within the first DPU set using the data file from among the data files located in the first DPU based on information stored in a demand matrix; and calculating time required to move the file from the first DPU to other DPUs within the first DPU set.

22. The method as recited in claim 21, wherein the information stored in the demand matrix comprises information relating to the plurality of computation jobs scheduled for processing at each DPU in the first DPU set and information relating to data files required by the plurality of computation jobs for processing.

23. The method as recited in claim 20, further comprising replacing the first data file in the first DPU by the second file captured from the second DPU when number of data files in the data files located in the first DPU is equal to the maximum number, and the first data file has a maximum expected latency among the data files located in the first DPU, and the first data file is not owned by the first DPU, wherein ownership of a file prevents replacement of such file at the owner DPU during the replication process.

24. The method as recited in claim 23, wherein the first data file is never deleted from the first DPU when the first data file is owned by the first DPU.

25. The method as recited in claim 23, further comprising replacing a third data file in the first DPU by the second data file captured from the second DPU when the first data file is owned by the first DPU, wherein an expected latency of the third data file is less than the maximum expected latency among the data files located in the first DPU but greater than the expected latency of the second data file.

26. The method as recited in claim 20, further comprising rejecting the second data file captured from the second DPU when the maximum expected latency in the data files located in the first DPU is less than the expected latency of the second data file.

27. A method for clustering and managing a plurality of data processing units (DPUs) in a grid computing system, the plurality of DPUs being interconnected with each other, each of the plurality of DPUs having a plurality of sets of data files stored in a memory/disk, a plurality of computation jobs being scheduled to be processed in the grid computing system, the method comprising:

sub-grouping the DPUs into a plurality of data processing unit (DPU) sets, each DPU set comprising a sub-group of the DPUs in the grid computing system and a core DPU elected from among the sub-group of DPUs based on a pre-determined criteria, the core DPU carrying information relating to sets of data files located at each DPU within the corresponding DPU set;

selection of a first data processing unit (DPU) from a first DPU set by a second DPU set based on a first predefined condition, and wherein a second core DPU within the second DPU set contacts a first core DPU within the first DPU set to acquire the first DPU;

removing the first DPU from the first DPU set and adding the first DPU to the second DPU set, based on a second predefined condition; and updating information regarding alterations to sub-grouping of the first DPU at a first demand matrix present at the first core DPU, and at a second demand matrix at the second core DPU, and at a history table located at a scheduling DPU, wherein the scheduling DPU receives the plurality of computation jobs and schedules each of the plurality of computation jobs at one of the plurality of DPU sets.

28. The method as recited in claim 27, wherein the first predefined condition further comprises:

checking whether the second DPU set is stronger than the first DPU set based on a demand for a first plurality of data files present at the first DPU set and a demand for a second plurality of data files present at the second DPU set;
checking whether a maximum limit of number of DPUs has been attained in the second DPU set; and
checking whether a minimum limit of number of DPUs has been attained in the first DPU set.

29. The method as recited in claim 27, wherein the second predefined condition further comprises:
checking whether a utility of the first DPU in the first DPU set is least among DPUs present in the first DPU set; and
checking whether a new utility of the first DPU after adding the first DPU to the second DPU set is increased above a minimum threshold.

30. The method as recited in claim 29, wherein the step of calculating the utility of the first DPU further comprises:
calculating a called frequency for each data file located at the first DPU, wherein the called frequency is a number of times each of the data files located at the first DPU is being moved from the first DPU to other DPUs within the first DPU set; and
calculating a ratio of a number of computation jobs scheduled at the first DPU against a total number of computation jobs scheduled at the first DPU set.

31. The method as recited in claim 27, wherein the information in the history table at the scheduling DPU comprises information about the plurality of computation of jobs being scheduled at each of the DPU sets, data files required by each of the plurality of computation jobs for processing, and data files present at each of the plurality of DPU sets.

32. The method as recited in claim 27, wherein the information in the first demand matrix at the first core DPU and the second demand matrix at the second core DPU comprises information about computation jobs scheduled at the first DPU set and the second DPU set respectively, and information about data files from the first plurality of data files and second plurality of data files being moved to other DPUs within the grid computing system.

33. The method as recited in claim 27, further comprising receiving new computational jobs for processing at the first DPU from the second core DPU after being added to the second set of DPUs.

34. The method as recited in claim 27, further comprising electing new core DPUs for the first and second DPU sets, wherein the new core DPUs have a minimum average of minimum bandwidth among all DPUs in the first and second DPU sets.

35. The method as recited in claim 27, further comprising transferring information about the first DPU from the first demand matrix to the second demand matrix.

36. A system for scheduling a plurality of computation jobs in a grid computing system and managing the grid computing system, wherein the grid computing system comprises a plurality of data processing units (DPUs) interconnected with each other, each of the plurality of data processing units having data files stored in a memory/disk, the plurality of computation jobs needing data files from the set of data files for processing, the system comprising:
a grid management module that sub-groups the DPUs to form a plurality of data processing unit (DPU) sets and thereafter manages the plurality of DPU sets, each DPU set comprising a sub-group of the DPUs in the grid computing system and a core DPU elected from among the sub-group of DPUs based on a pre-determined criteria, the core DPU carrying information relating to sets of data files located at each DPU within the corresponding DPU set;
a scheduling module that schedules each of the plurality of computation jobs for execution by at least one of the plurality of DPUs based on data files available with the plurality of DPUs;
a replication module that replicates one or more files from data files available with a DPU to other DPUs in the grid computing system based on scheduling of the plurality of computation jobs.

37. The system as recited in claim 36, wherein the scheduling module further comprises:
a scheduling DPU that receives a computation job from the plurality of computation jobs and schedules the computation job for execution at a first DPU set from the plurality of DPU sets based on a first scheduling criteria; and
a set of core DPUs comprising core DPUs of each of the plurality of DPU sets elected by the grid management module, wherein a first core DPU within the first DPU set schedules the first computation job to a first DPU within the first DPU set based on a second scheduling criteria.

38. The system as recited in claim 37, wherein the scheduling DPU stores a history table in its memory, and wherein the history table stores information about at least the plurality of computation jobs, computation jobs being scheduled at each of the plurality of DPU sets and data files located within each of the plurality of DPU sets.

39. The system as recited in claim 37, wherein the replication module further comprises a global replication module that replicates data files from among data files present at a DPU set to another DPU set, wherein communication between the DPU sets happens via their respective core DPUs.

40. The system as recited in claim 39, wherein the global replication module uses the history table stored at the scheduling DPU to replicate data files between the plurality of DPU sets.

41. The system as recited in claim 37, wherein the first core DPU further comprises a first demand matrix in its memory, wherein the first demand matrix stores information comprising computation jobs being scheduled at each DPU within the first DPU set, and data files present at each DPU within the first DPU set.

42. The system as recited in claim 41, wherein the replication module further comprises a local replication module that replicates data files from the first DPU to other DPUs in the first DPU set.

43. The system as recited in claim 42, wherein the local replication module uses information stored in the first demand matrix to replicate data files from the first DPU to other DPUs within the first DPU set.

44. The system as recited in claim 37, wherein the first scheduling criteria comprises scheduling the computation job at the first DPU set when the first DPU set has a least cost of scheduling the first computation job.

45. The system as recited in claim 37, wherein the second scheduling criteria comprises scheduling the computation job at the first DPU of the first DPU set when the first DPU has a least cost of scheduling the computation job.

46. The system as recited in claim 37, wherein the grid management module further comprises:
a core election module that elects one core DPU for each of the plurality of DPU sets; and
an addition module that adds DPUs from one DPU set to another DPU set based on computation jobs scheduled at each of the plurality of DPU sets.

47. A computer program product comprising a non-transitory computer usable medium having a computer readable program code embodied therein for scheduling processing of a plurality of computation jobs in a grid computing system, the grid computing system comprising a plurality of data processing units (DPUs) that are interconnected, each of the plurality of DPUs storing data files in a memory/disk, wherein each of the plurality of computation jobs requires a set of data files for processing, the computer readable program code having instructions for:

sub-grouping the DPUs into a plurality of data processing unit (DPU) sets, each DPU set comprising a sub-group of the DPUs in the grid computing system and a core DPU elected from among the sub-group of DPUs based on a pre-determined criteria, the core DPU carrying information relating to data files located at each DPU within the corresponding DPU set;

receiving a computation job from the plurality of computation jobs at a scheduling DPU;

scheduling the computation job for execution within a first DPU set based on a first scheduling criteria, wherein the step of scheduling based on the first scheduling criteria is executed at the scheduling DPU;

scheduling the first computation job for execution at a first DPU within the first DPU set based on a second scheduling criteria, wherein the step of scheduling for execution at the first DPU is carried out by a core DPU corresponding to the first DPU set;

storing at the scheduling DPU, a history table comprising information about at least the first DPU set and data files present within the first DPU set;

storing at each core DPU, a demand matrix comprising information relating to computation jobs scheduled for execution within the corresponding DPU set and information relating to data files present at each DPU within the corresponding DPU se;

replicating one or more files from data files available with a DPU to other DPUs in the grid computing system based on scheduling of the plurality of computation jobs.

48. The computer program product as recited in claim 47, wherein the history table is stored in the memory of the scheduling DPU.

49. The computer program product as recited in claim 47, wherein scheduling the computation job further comprises checking a validity of the scheduling criteria.

50. The computer program product as recited in claim 49, wherein the scheduling criteria comprises:

scheduling the computation job at the first DPU set when the first DPU set has a least cost of scheduling the computation job; and scheduling the computation job at the first DPU within the first DPU set when the first DPU has a least cost of scheduling the computation job.

* * * * *

UNITED STATES PATENT AND TRADEMARK OFFICE
CERTIFICATE OF CORRECTION

PATENT NO.        : 8,356,303 B2
APPLICATION NO.   : 12/315958
DATED             : January 15, 2013
INVENTOR(S)       : Shubhashis Sengupta, Anirban Chakrabarti and Lopamudra Chakrabarti It is certified that error appears in the above-identified patent and that said Letters Patent is hereby corrected as shown below:

IN THE CLAIMS:

Column 19, line 27, after "set of" delete "input".
Column 20, line 66, insert --,-- between "set is".
Column 21, line 25, "set" should read --sets--.
Column 26, line 1, insert --,-- between "storing at".
Column 26, line 4, insert --,-- between "storing at".
Column 26, line 8, "se" should read --set--.

Signed and Sealed this
Fourteenth Day of April, 2015

Michelle K. Lee
*Director of the United States Patent and Trademark Office*